US009286191B2

(12) United States Patent
Carson et al.

(10) Patent No.: US 9,286,191 B2
(45) Date of Patent: *Mar. 15, 2016

(54) LOGGING CODE GENERATION AND DISTRIBUTION

(71) Applicant: International Business Machines Corporation, Armonk, NY (US)

(72) Inventors: Craig A. Carson, Mirrabooka (AU);
Bret W. Dixon, South Perth (AU);
Benjamin T. Horwood, Highgate (AU);
John A. Kaputin, Rockingham (AU);
Adam J. Pilkington, Fair Oak (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,586

(22) Filed: Oct. 23, 2014

(65) Prior Publication Data

US 2015/0278074 A1 Oct. 1, 2015

Related U.S. Application Data

(63) Continuation of application No. 14/228,724, filed on Mar. 28, 2014.

(51) Int. Cl.
*G06F 11/00* (2006.01)
*G06F 11/36* (2006.01)

(52) U.S. Cl.
CPC ........ *G06F 11/3636* (2013.01); *G06F 11/3624* (2013.01)

(58) Field of Classification Search
USPC ...................................... 714/38.11
See application file for complete search history.

(56) References Cited

U.S. PATENT DOCUMENTS

| 7,614,043 | B2 | 11/2009 | Ognev et al. | |
| 7,788,540 | B2 | 8/2010 | Merriman et al. | |
| 7,987,390 | B2 | 7/2011 | Chandrasekaran | |
| 9,015,682 | B1* | 4/2015 | Hjelmstad | G06F 9/545 717/145 |
| 2004/0225964 | A1* | 11/2004 | Simonyi | G06F 8/71 715/256 |
| 2005/0071820 | A1 | 3/2005 | Srinivas et al. | |
| 2009/0320045 | A1* | 12/2009 | Griffith | H04L 67/2842 719/315 |
| 2012/0151453 | A1 | 6/2012 | Finking et al. | |
| 2013/0074052 | A1* | 3/2013 | Adams | G06F 9/30192 717/140 |

(Continued)

OTHER PUBLICATIONS

Carson et al., "Logging Code Generation and Distribution," Filed on Mar. 28, 2014, p. 1-23, U.S. Appl. No. 14/228,724.
Cleve et al., "Locating Causes of Program Failures", ICSE'05, May 15-21, 2005, p. 342-351, St. Louis, Missouri, USA.
Microsoft et al., "Method and System for Automatically Triaging and Managing Customer Reported Failures", IP.com, Dec. 14, 2007, IPCOM000162422D.

(Continued)

*Primary Examiner* — Sarai Butler
(74) *Attorney, Agent, or Firm* — Patricia B. Feighan; Jeanine Ray

(57) ABSTRACT

A method for diagnosing an error associated with a software is provided. The method may include receiving a stack trace associated with the error. The method may also include fetching a source code associated with the received stack trace. The method may further include parsing the fetched source code associated with the received stack trace. The method may also include generating an abstract syntax tree (AST) based on the parsed fetched source code. Additionally, the method may include inserting at least one logging call into the generated abstract tree. The method may include recompiling the captured code based on the generated abstract tree with the at least one inserted logging call. The method may also include uploading the recompiled code onto at least one deployment server.

8 Claims, 3 Drawing Sheets

(56) References Cited

U.S. PATENT DOCUMENTS

| | | |
|---|---|---|
| 2013/0311975 A1 | 11/2013 | Supplisson et al. |
| 2014/0130158 A1* | 5/2014 | Wang .................... G06F 21/566 726/23 |

OTHER PUBLICATIONS

IBM, "List of IBM Patents or Patents Applications Treated as Related (Appendix P)," Oct. 23, 2014.

* cited by examiner

LOGGING CODE GENERATION AND DISTRIBUTION

CROSS REFERENCE

The present application is a continuation of and claims priority under 35 U.S.C. §120 of U.S. patent application Ser. No. 14/228,724 filed on Mar. 28, 2014, which is incorporated by reference in its entirety.

FIELD OF THE INVENTION

The present invention relates generally to the field of computing, and more particularly to software errors.

BACKGROUND

In the course of supporting production software, errors may frequently be reported in the form of stack traces for languages using stack based architectures. After a user encounters such a problem, they may report a bug to the developer along with the accompanying stack trace. Using this information, the developer may diagnose the problem and provide a solution or fix for the problem. Currently, logging technologies exist including core dump analysis (when the whole program has crashed), and those in the area of aspect oriented programming and technology relating to bytecode injection in Java.

SUMMARY

According to one embodiment, a method for diagnosing an error associated with a software is provided. The method may include receiving a stack trace associated with the error. The method may also include fetching a source code associated with the received stack trace. The method may further include parsing the fetched source code associated with the received stack trace. The method may also include generating an abstract syntax tree (AST) based on the parsed fetched source code. Additionally, the method may include inserting at least one logging call into the generated abstract tree. The method may include recompiling the captured code based on the generated abstract tree with the at least one inserted logging call. The method may also include uploading the recompiled code onto at least one deployment server.

According to another embodiment, a computer system for diagnosing an error associated with a software is provided. The computer system may include one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method. The method may include receiving a stack trace associated with the error. The method may also include fetching a source code associated with the received stack trace. The method may further include parsing the fetched source code associated with the received stack trace. The method may also include generating an abstract syntax tree (AST) based on the parsed fetched source code. Additionally, the method may include inserting at least one logging call into the generated abstract tree. The method may include recompiling the captured code based on the generated abstract tree with the at least one inserted logging call. The method may also include uploading the recompiled code onto at least one deployment server.

According to yet another embodiment, a computer program product for diagnosing an error associated with a software is provided. The computer program product may include one or more computer-readable tangible storage medium and program instructions stored on at least one of the one or more tangible storage medium, the program instructions executable by a processor. The computer program product may include program instructions to receive a stack trace associated with the error. The computer program product may also include program instructions to fetch a source code associated with the received stack trace. The computer program product may further include program instructions to parse the fetched source code associated with the received stack trace. The computer program product may also include program instructions to generate an abstract syntax tree (AST) based on the parsed fetched source code. Additionally, the computer program product may include program instructions to insert at least one logging call into the generated abstract tree. The computer program product may include program instructions to recompile the captured code based on the generated abstract tree with the at least one inserted logging call. The computer program product may also include program instructions to upload the recompiled code onto at least one deployment server.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
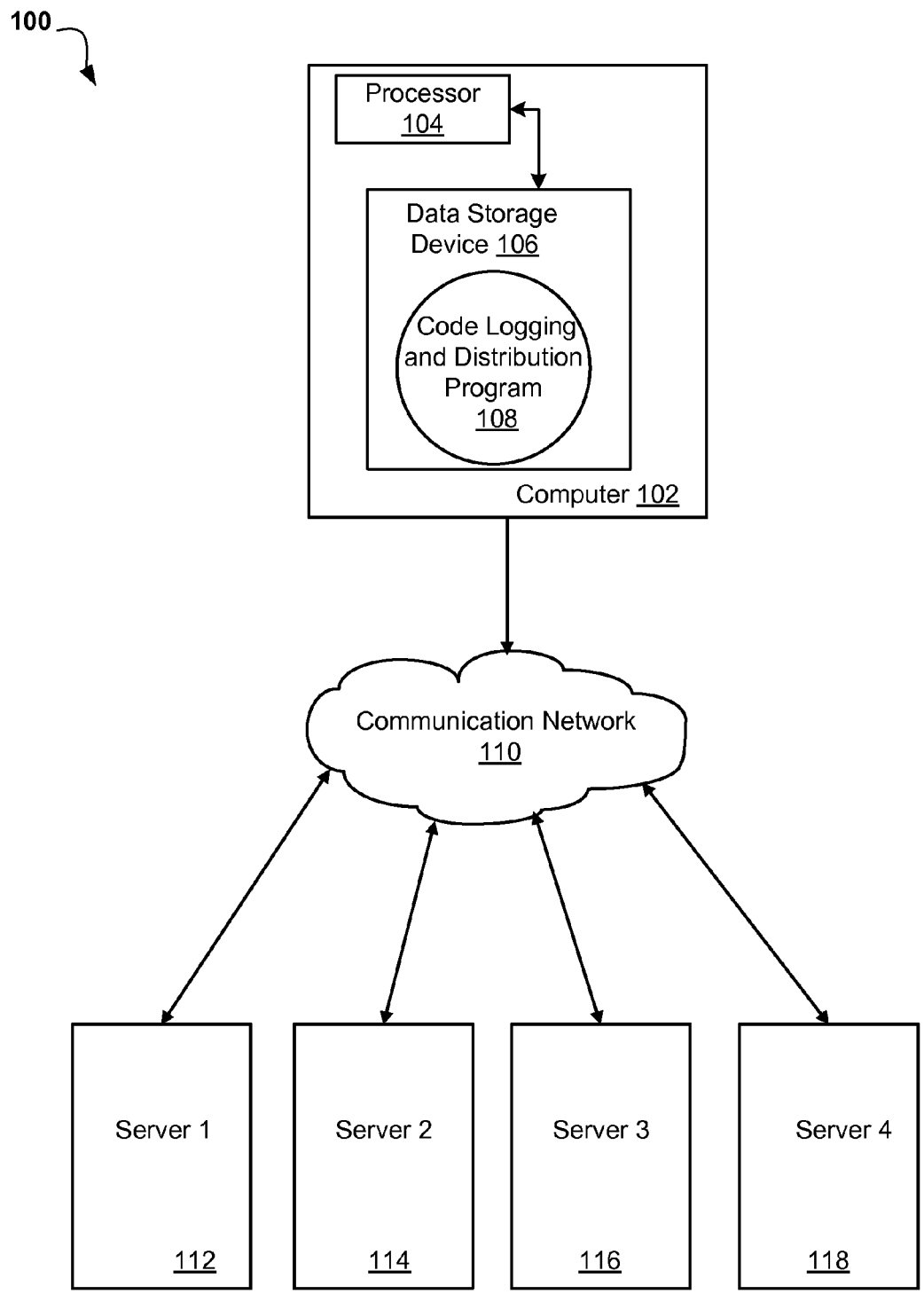
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to software errors. The following described exemplary embodiments provide a system, method and program product to, among other things, diagnose an encountered software problem and automatically send the information gathered to the developers of the software.

As previously described, in the course of supporting production software, errors may frequently be reported in the form of stack traces for languages using stack based architectures such as Java, C, C++, and Pascal. After a user encounters such a problem, the user may report a bug to the developer along with the accompanying stack trace. Using this information, the developer may diagnose the problem and provide a solution or fix for the problem. Currently, logging technologies exist, including core dump analysis (when the whole program has crashed), and those in the area of aspect oriented programming and technology relating to bytecode injection in Java. However, not all developers may implement the use of these debugging technologies since core dumps may not be instantly available in cases where errant behavior and exceptions are observed, but the software does not crash. As such, another current method may be to have logging code incorporated into a whole application and enabled or disabled by changing a local setting in the application. However, such a method, may bloat code and become an onerous task for developers. Therefore, it may be advantageous, among other things, to provide a way in which upon encountering a stack trace, with little or no interaction, tailored software may be delivered to the user that includes specific debug logging code to diagnose the problem encountered and additionally, send the information gathered to the developers.

According to at least one embodiment, when a stack trace is encountered, the system may specifically and automatically rebuild an executable module to log, debug information, and may distribute the executable module to the customer. Additionally, the executable module may contain the means to automatically submit the results back to the developer. The present embodiment may not require aspect oriented logging techniques and as such, may remove the requirement of the developer to insert endless lines of logging code. Furthermore, the present embodiment may provide a more efficient turnaround of the problem as compared to the current techniques previously discussed and the developers may receive appropriate information sooner than with the current methods as well.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to diagnose an encountered software problem and automatically send the information gathered to the developers of the software. According to one implementation of the present embodiment, when an error that generates a stack trace is encountered, the error may be captured and displayed to the user along with an optional prompt asking the user if they want to report the error to the software developer. A stack trace is a report of the active stack frames at a certain point in time during the execution of a program. A stack trace allows tracking the sequence of nested functions called up to the point where the stack trace is generated.

If the client (i.e., user) selects "yes" to send the report to the software developer, then the stack trace may be sent to a quality assurance (QA) system or the build server. However, according to an alternate embodiment, the stack trace may automatically be sent to a QA system or to the build server without any user intervention. Then, on receipt of the stack trace, the system may automatically create a problem record and the code listed in the stack trace may be pulled out of source control. The system may then perform a parse on the code in order to generate an Abstract Syntax Tree (AST). An AST is a tree representation of the abstract syntactic structure of source code written in a programming language. As such, each node of the tree may denote a construct occurring in the source code. Therefore, the syntax is "abstract" since the syntax does not represent every detail appearing in the real syntax. Then, according to the present embodiment, the logging calls may be inserted into the AST along the path of the stack trace. The logging calls may take many forms and be configurable, however, all objects in scope within the particular method may be printed out (for example, by using their toString( ) method in Java) to a log file. Then the calls may be inserted into the AST for packaging the log file together and uploading it back to the developers systems at the point of catching the exception.

Referring now to FIG. 1, an exemplary networked computer environment 100 in accordance with one embodiment is depicted. The networked computer environment 100 may include a computer 102 with a processor 104 and a data storage device 106 that is enabled to run a code logging and distribution program 108. The networked computer environment 100 may also include a plurality of server computers, such as a build server 112, a deployment server 114, a Quality Assurance (QA) server 116, and a source repository server 118, and a communication network 110. The networked computer environment 100 may include a plurality of computers 102 only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements. For example, in an alternate implementation of the present embodiment, all four server computers 112-118 may be incorporated together into one server 112.

The client computer 102 may communicate with server computers 112-118 via the communications network 110. The communications network 110 may include connections, such as wire, wireless communication links, or fiber optic cables. As will be discussed with reference to FIG. 3, server computers 112-118 may include internal components 800a, b,c,d and external components 900a,b,c,d, respectively and client computer 102 may include internal components 800e and external components 900e, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a code logging and distribution program 108 may run on the client computer 102 and may be deployed on a deployment server, such as (server computer 2) 114. Client computer 102 may generate an error which may need to be diagnosed and in which a fix may need to be determined. Client computer 102 may communicate with (server computer 3) 116 to create an error record and upload the stack trace associated with the encountered error. As such, (server computer 3) 116 may be a quality assurance (QA) server that manages bug reports (i.e. error reports) and stores the stack traces associated with the encountered errors. Additionally, the quality assurance system (QA) may run quality management software. The quality assurance system may keep track of software defects and may provide reporting capability of such software defects.

According to one implementation, (server computer 1) (i.e., the build server) 112 may contain a program that is capable of fetching any reported stack trace from (server computer 3) (i.e., the QA server) 116 and the associated source code from (server computer 4) (i.e., the repository server) 118 which may contain the source repository where all source code is stored. Furthermore, (server computer 1) (i.e., the build server) 112 may parse the fetched source code, generate an abstract syntax tree (AST), insert logging calls into the AST, and regenerate a program. Then, (server computer 1) 112 (i.e., the build server) may publish the resultant program to (server computer 2) (i.e., the deployment server) which may be a web server that is capable of storing any modified programs containing logging code and is capable of redistributing the modified programs to client computer 102. According to one implementation, (server computer 1) (i.e., the build server) 112 may also update the associated records on (server computer 3) (i.e., the QA server) 116 and send the information gathered to the developers of the software.

According to one implementation of the present embodiment, the code logging and distribution program may optionally prompt and ask the user if they want to report the encountered error to the software developer. If the client (i.e., user) selects "yes" to send the report to the software developer, then the stack trace may be sent to a quality assurance (QA) system (running on server computer 3) 116 or the build server (running on server computer 1) 112. However, according to an alternate embodiment, the stack trace may automatically be sent to the QA system (running on server computer 3) 116 or to the build server (running on server computer 1) 112 without any user intervention. Then, on receipt of the stack trace, the code logging and distribution program may automatically create a problem record and the code listed in the stack trace may be pulled out of source control. The code logging and distribution program may then perform a parse on the code in order to generate an Abstract Syntax Tree (AST). According to the present embodiment, the logging calls may be inserted into the AST along the path of the stack trace. Then the calls may be inserted into the AST for packaging the log file together and uploading it back to the developers systems at the point of catching the exception. The code logging and distribution method is explained in further detail below with respect to FIG. 2.

Figure 2:
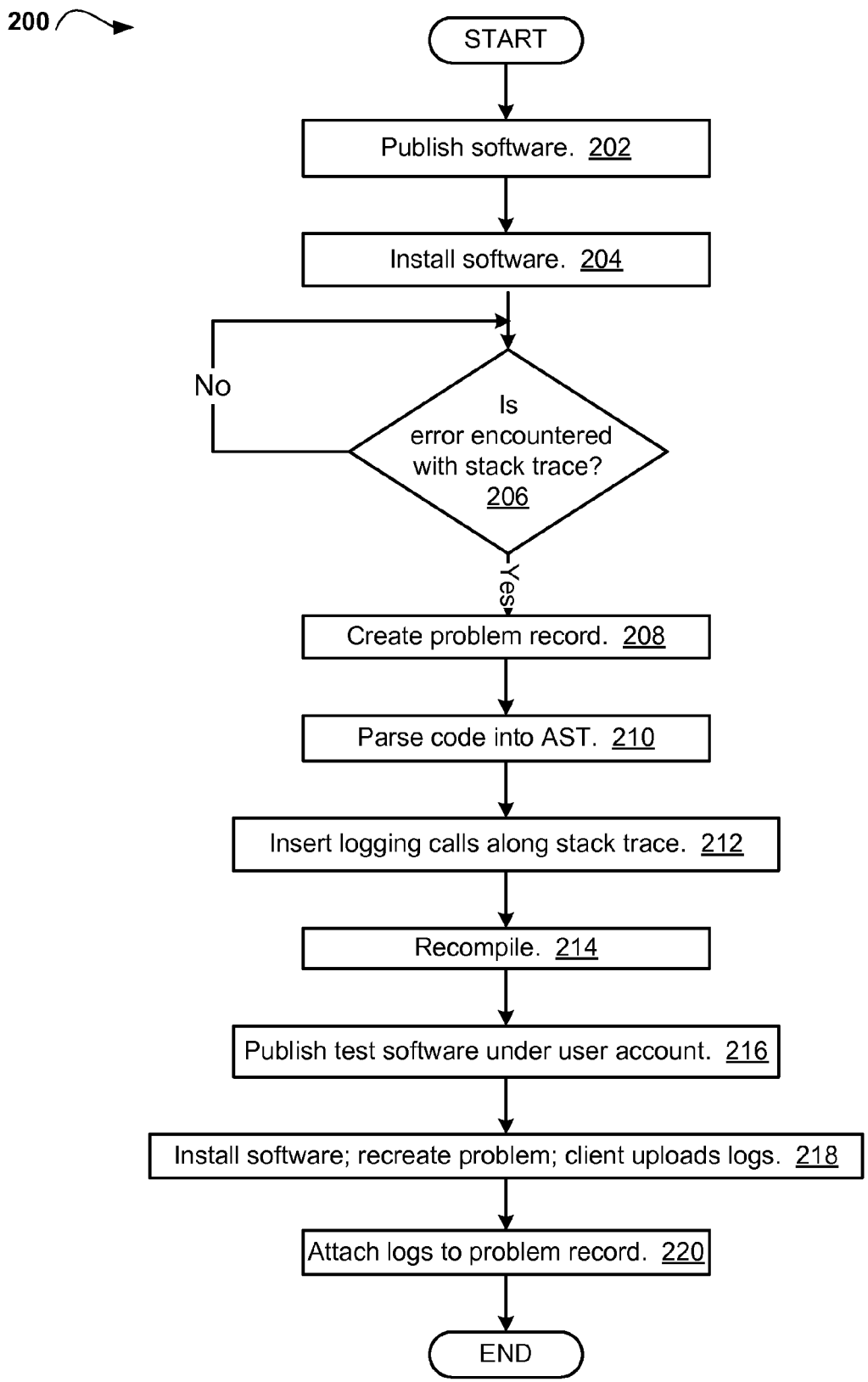
FIG. 2 is an operational flowchart illustrating the steps carried out by a program to diagnose an encountered software problem and automatically send the information gathered to the developers of the software according to at least one embodiment.

FIG. 2, an operational flowchart 200 illustrating the steps carried out by a program to diagnose an encountered software problem and automatically send the information gathered to the developers of the software is depicted. At 202, the software is published. As such, the client software may be published on the deployment server 114 (FIG. 1). Then, at 204, the client downloads the software and begins to use it. For example, a user using a client computer 102 (FIG. 1) may download the published software from the deployment server 114 (FIG. 1) and install the downloaded software onto the client computer 102 (FIG. 1) and begin using the software.

Next, at 206, it is determined whether an error with a generated stack trace has been encountered. As previously explained, a stack trace is a report of the active stack frames at a certain point in time during the execution of a program. A stack trace may allow the tracking of the sequence of nested functions called up to the point where the stack trace is generated. For example, a user using the downloaded software on the client computer 102 (FIG. 1) may encounter an error that generates a stack trace. If at 206, it is determined that an error with a generated stack trace has not been encountered, then the method may continue to wait for an error with an associated stack trace to occur.

However, if at 206 it is determined that an error has been encountered and a stack trace has been generated, then at 208, a problem record is created. For example, on receipt of the stack trace, the present embodiment may automatically create a problem record whereby the source code listed in the stack trace may be pulled (i.e., fetched) out of source control (i.e., captured by the code logging and distribution program 108 (FIG. 1)) and recorded in a problem record.

Then, at 210 the fetched source code may be parsed into an abstract syntax tree (AST). As such, the code logging and distribution program 108 (FIG. 1) may perform a parse on at least one object associated with the fetched source code in order to generate an abstract syntax tree. As previously explained, an abstract syntax tree (AST) is a tree representation of the abstract syntactic structure of the source code.

Next, at 212, logging calls are inserted along the stack trace. For example, at least one logging call may be inserted by the code logging and distribution program 108 (FIG. 1) into the generated AST along the path of the stack trace. According to different implementations of the present embodiment, the logging calls may take many forms and may be configurable; however, all objects in scope within the particular method (i.e., the fetched source code) being parsed may be printed out (for example, by using their toString( ) method in Java) to a log file. Furthermore, according to at least one implementation, the logging calls may be inserted into the AST for packaging the log file together and uploading it back to the developers systems at the point of catching the exception.

Then at 214, the source code (i.e., the fetched source code) is recompiled based on the generated AST with the at least one inserted logging call. As such, according to one implementation, the AST may be used to either regenerate a new source code for compilation, or the AST may be compiled directly into bytecode, so that a new executable or distributable may be generated.

Next at 216, the test software is published under the user's account. Therefore, the new program (i.e., the recompiled fetched source code) may be published on the deployment server 114 (FIG. 1) under the client's user account. Then at 218, the method installs the test software; recreates the problem; and the user can upload the logs. As such, according to one implementation, the client's software may be automatically updated using a standard auto update mechanism. For example, a service or background process may be used to poll the client's account for an updated version. The service may then prompt the user to allow the download and install. Then, the user may be prompted to recreate the error if desired and upload the associated log information. Next, upon recreation of the error, at 220, the new program may attach the logs to the problem record. As such, the new program may pack up the generated log file and upload it to the developer's system, attaching it to the problem record previously created in step 208. Then, according to one implementation, the system may signal the developer that a new problem report is available and along with the stack trace, the generated log file containing the additional debugging information is available as well.

It may be appreciated that FIG. 2 provides only an illustration of one implementation and does not imply any limitations with regard to how different embodiments may be implemented. Many modifications to the depicted environments may be made based on design and implementation requirements. For example, in an alternate implementation of the present embodiment, the initial error that generated a stack trace may be caught and displayed to the user along, optionally with a prompt asking the user if they wish to report this problem to the developer. If the client selects 'yes', or the operation is assumed to be performed automatically, then stack trace may be sent on to a QA system running on a QA server 116 (FIG. 1) or directly to the build server 112 (FIG. 1) (though these may be one and the same according to some implementations).

Additionally, the process previously explained with respect to FIG. 2 depicts the user manually installing the debug executable and manually uploading logs to the problem record. However, these depict just one example of an implementation, and may be optional steps, as the whole process may be automated in an alternate implementation by including updating and submission code in the relevant executables associated with the code logging and distribution program 108 (FIG. 1).

Figure 3:
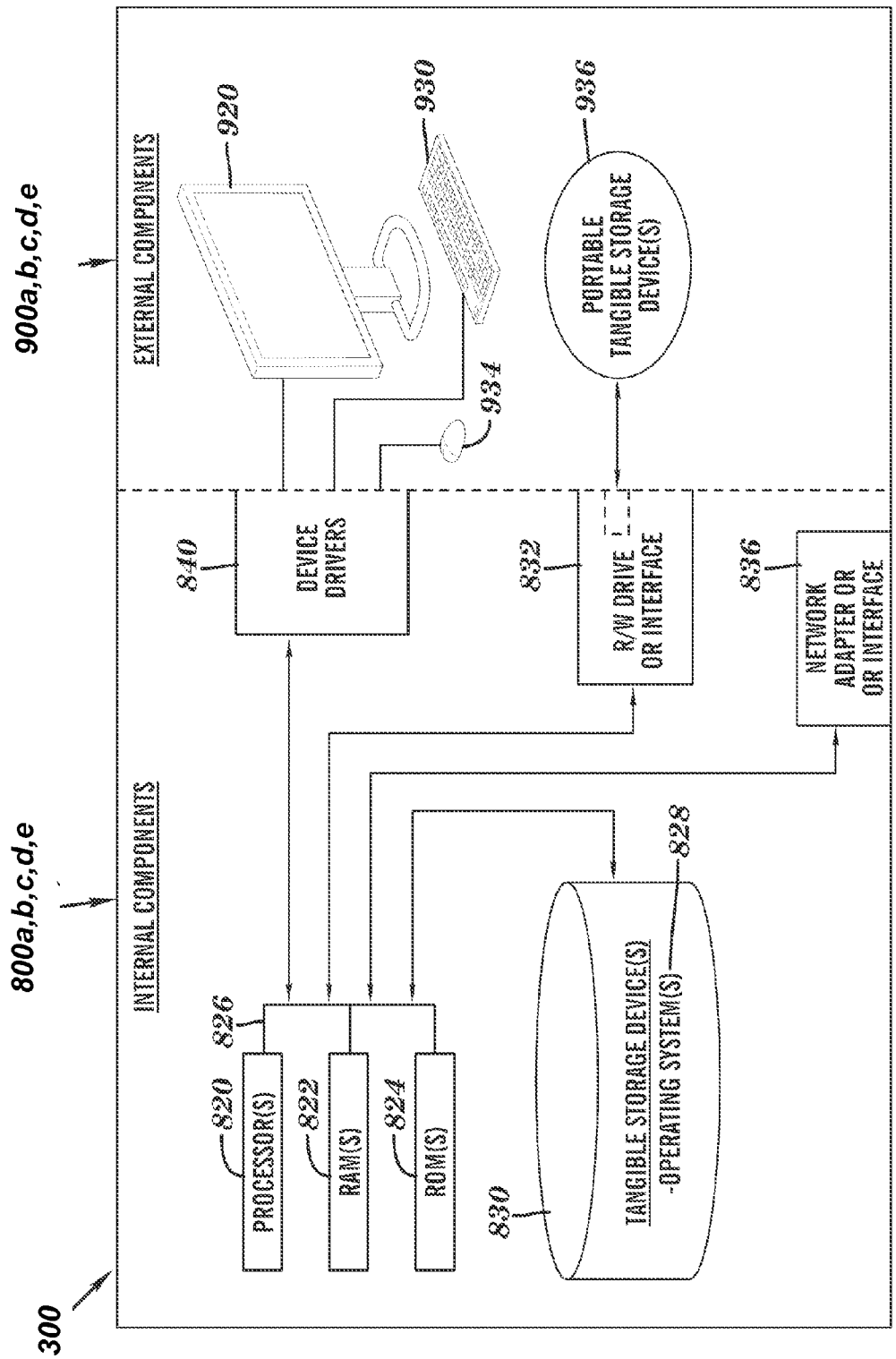
FIG. 3 is a block diagram of internal and external components of computers and servers depicted in FIG. 1 according to at least one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network servers 112-118 (FIG. 1) may include respective sets of internal components 800a, b, c, d, e and external components 900a, b, c, d, e illustrated in FIG. 3. Each of the sets of internal components 800a, b, c, d, e includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and code logging and distribution program 108 (FIG. 1) in client computer 102 is stored on one or more of the respective computer-readable tangible storage medium 830 for execution by one or more of the respective processors 820 via one or more of the respective RAMs 822 (which typically include cache memory). In the embodiment illustrated in FIG. 3, each of the computer-readable tangible storage medium 830 is a magnetic disk storage device of an internal hard drive. Alternatively, each of the computer-readable tangible storage medium 830 is a semiconductor storage device such as ROM 824, EPROM, flash memory or any other computer-readable tangible storage device that can store a computer program and digital information.

Each set of internal components 800a, b, c, d, e also includes a R/W drive or interface 832 to read from and write to one or more portable computer-readable tangible storage medium 936 such as a CD-ROM, DVD, memory stick, magnetic tape, magnetic disk, optical disk or semiconductor storage device. A software program, such as code logging and distribution program 108 can be stored on one or more of the respective portable computer-readable tangible storage medium 936, read via the respective R/W drive or interface 832 and loaded into the respective hard drive 830.

Each set of internal components 800a, b, c, d, e also includes network adapters or interfaces 836 such as a TCP/IP adapter cards, wireless Wi-Fi interface cards, or 3G or 4G wireless interface cards or other wired or wireless communication links. The code logging and distribution program 108 in client computer 102 can be downloaded to client computer 102 from an external computer via a network (for example, the Internet, a local area network or other, wide area network) and respective network adapters or interfaces 836. From the network adapters or interfaces 836, the code logging and distribution program 108 in client computer 102 is loaded into the respective hard drive 830. The network may comprise copper wires, optical fibers, wireless transmission, routers, firewalls, switches, gateway computers and/or edge servers.

Each of the sets of external components 900a, b, c, d, e can include a computer display monitor 920, a keyboard 930, and a computer mouse 934. External components 900a, b, c, d, e can also include touch screens, virtual keyboards, touch pads, pointing devices, and other human interface devices. Each of the sets of internal components 800a, b, c, d, e also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for diagnosing an error associated with a software, the method comprising:
   receiving a stack trace associated with the error;
   fetching a source code associated with the received stack trace;
   parsing the fetched source code associated with the received stack trace;
   generating an abstract syntax tree (AST) based on the parsed fetched source code;
   inserting at least one logging call into the generated abstract tree; and
   recompiling the fetched source code based on the generated abstract tree with the at least one inserted logging call.

2. The method of claim 1, further comprising:
   uploading the recompiled source code onto at least one deployment server.

3. The method of claim 1, wherein the receiving of the stack trace comprises creating a problem record associated with the received stack trace.

4. The method of claim 1, wherein the inserting at least one logging call comprises printing the at least one parsed object to a log file.

5. The method of claim 1, wherein the fetching the source code comprises pulling the fetched source code out of source control.

6. The method of claim 1, wherein the at least one logging call is configurable.

7. The method of claim 1, wherein the recompiled code is installed onto at least one device associated with a user of the software.

8. The method of claim 4, wherein the log file is uploaded to at least one developer's system associated with the software.

* * * * *